(12) United States Patent
Wolvin (10) Patent No.: US 7,588,223 B2
(45) Date of Patent: Sep. 15, 2009

(54) CLAMP FOR CLAMPING AN OBJECT

(76) Inventor: Derek Wolvin, 144 William-Davis, Gatineau, QB (CA) J9J 2Z4

( * ) Notice: Subject to any disclaimer, the term of this patent is extended or adjusted under 35 U.S.C. 154(b) by 0 days.

(21) Appl. No.: 11/859,258

(22) Filed: Sep. 21, 2007

(65) Prior Publication Data
US 2009/0078840 A1  Mar. 26, 2009

(51) Int. Cl.
A47B 96/00 (2006.01)
(52) U.S. Cl. .............................. 248/229.15; 248/229.25
(58) Field of Classification Search ............ 248/229.15, 248/229.25, 228.6, 230.6, 231.71; 269/249, 269/172, 182; 29/257
See application file for complete search history.

(56) References Cited

U.S. PATENT DOCUMENTS

| | | | |
|---|---|---|---|
| 1,535,570 A | 4/1925 | Bryant | |
| 2,322,107 A * | 6/1943 | Balcar | ..................... 269/224 |
| 2,635,656 A | 4/1953 | Moore et al. | |
| 2,796,787 A | 6/1957 | Aske | |
| 3,856,246 A | 12/1974 | Sinko | |
| 4,139,189 A | 2/1979 | Wietrzyk | |
| 4,951,932 A | 8/1990 | Thomas | |
| 5,024,428 A | 6/1991 | Ramsay | |
| 5,195,553 A | 3/1993 | Wright | |
| 5,326,059 A | 7/1994 | Pryor et al. | |
| 5,586,378 A * | 12/1996 | Smith | ......................... 29/257 |
| 5,695,178 A | 12/1997 | Lenzkes | |
| 6,045,414 A | 4/2000 | DeFrance | |
| 6,296,241 B1 | 10/2001 | Harrison | |
| 7,111,965 B2 * | 9/2006 | Hsu | ......................... 362/396 |
| 2006/0043662 A1 * | 3/2006 | Blake, III | ................... 269/249 |
| 2006/0214073 A1 | 9/2006 | Mominee et al. | |
| 2006/0225262 A1 | 10/2006 | Federico | |

FOREIGN PATENT DOCUMENTS

| | | |
|---|---|---|
| DE | 4219155 | 12/1993 |
| FR | 2676110 | 11/1992 |
| JP | 2005351303 | 12/2005 |

* cited by examiner

Primary Examiner—Ramon O Ramirez
(74) Attorney, Agent, or Firm—RatnerPrestia (57) ABSTRACT

A clamp comprises opposed members having clamping surfaces defining a distance therebetween for receiving and clamping an object. An adjustment mechanism is associated with at least one of the members for varying the distance over a continuous range. A spacer assembly being removably associated with at least one of the members for varying the distance by at least one discrete increment.

20 Claims, 8 Drawing Sheets

FIG. 15

CLAMP FOR CLAMPING AN OBJECT

FIELD OF THE INVENTION

This invention relates to a clamp. In particular, though not exclusively, the invention relates to a clamp used as a base for attaching an item to a surface.

BACKGROUND OF THE INVENTION

Clamps are used for numerous reasons. In some instances, a clamp is used to hold a work piece in place to be worked on. In other instances, a clamp is used to provide a base to mount an item to a surface.

In the case of a table clamp, the clamp can be used as a base for mounting an item on the table. For example, the clamp is fastened to the table; the clamp is adapted to connect to an arm; and an item can be suspended from the arm which is connected to the clamp. Examples of items attached to tables in this manner are task lamps, computer monitors, and various trays for holding items such as office supplies and telephones.

A clamp used for such a purpose is typically designed to accommodate tables of varying thicknesses. Such clamps are often C-clamps which include a screw that can be used to adjust the distance between the opposing clamping surfaces of the C-clamp so the clamp may be tightened against the table and thus held in place. The range of thicknesses of tables to which such a C-clamp can attach is limited by the size of the C-clamp and the length of travel of the screw in the C-clamp. To accommodate a greater range of table thicknesses, typically the size of the C-clamp and the length of the screw needs to be increased.

SUMMARY OF THE INVENTION

In a broad aspect, the invention provides a clamp comprising a frame supporting opposed members having clamping surfaces defining a distance therebetween for receiving and clamping an object; an adjustment mechanism associated with at least one of the members for varying the distance over a continuous range; and a spacer assembly being removably fastenable to at least one of the members for varying the distance by at least one discrete increment.

In some embodiments, the opposed members comprise a first member and a second member and the spacer assembly is associated with the first member.

In some embodiments, the spacer assembly comprises a block having a thickness and the block and the first member define co-operating protrusions and receiving portions for fastening the block to the second member with the distance decreased by the thickness.

In some embodiments, the protrusions comprise the first member having parallel arms which define a channel therebetween and the receiving portions comprise a narrow portion of the block sized to receive the arms.

In some embodiments, the narrow portion comprises a post which connects a first portion of the block to a second portion of the block.

In some embodiments, the first portion of the block has a first thickness and the second portion of the block has a second thickness different from the first thickness and the block can be reversibly fastened in the first member wherein the distance can be decreased by either the first thickness or the second thickness.

In some embodiments, the spacer assembly further comprises at least one block adapter having an adapter thickness wherein the block and the block adapter define co-operating adapter protrusions and receiving portions for fastening the block adapter to the block to further decrease the distance by the adapter thickness.

In some embodiments, the adapter protrusions comprise at least one post projecting from the adapter and sized to fit into a hole on the block.

In some embodiments, the clamp further comprises at least one second adapter having a second adapter thickness wherein the adapter and the at least one second adapter define further co-operating protrusions and receiving portions for fastening the second adapter to the block adapter to further decrease the distance by the second adapter thickness.

In some embodiments, the spacer assembly comprises a rod having spacing elements slidably retained on the rod; a space being movable between the spacing elements by moving the spacing elements on the rod; the first member defining a protrusion for insertion into the space for fastening the spacer assembly to the first member, the distance decreasing by the thickness of the spacing elements inserted into the distance.

In some embodiments, the protrusions comprise the first member having parallel arms which define a channel therebetween for receiving a portion on the rod extending through the space.

In some embodiments, the spacing elements comprise a plurality of rings of different thicknesses.

In some embodiments, the spacing elements further comprise plates fastened on each end of the rod.

In some embodiments, the adjustment mechanism is associated with the second member.

In some embodiments, the adjustment mechanism comprises a threaded opening in the second member and a threaded bolt axially moveable therein in a direction of the distance.

In some embodiments, the bolt comprises an orifice opposite the direction, the orifice being sized to receive a post for mounting the post thereto.

In some embodiments, the post is a post of a table lamp for mounting the table lamp to a table.

In some embodiments, the clamp further comprises a removable sleeve encircling a head of the bolt.

In some embodiments, the adjustment mechanism further comprises a plate mounted to swivel on the end of the bolt for clamping the object.

BRIEF DESCRIPTION OF THE DRAWINGS

Embodiments of the invention will now be described with reference to the attached drawings in which.

DETAILED DESCRIPTION OF THE EMBODIMENTS

FIGS. 1 to 6 show a clamp 10 in three possible configurations. The three possible configurations change the distance between the clamping surfaces. The distance is changed in increments by the presence and orientation of a spacer 12. The distance can also be varied by the use of an adjustment mechanism at the opposite end of the clamp. The adjustment mechanism includes a bolt or screw 14 connected to a clamping plate 16. Travel of the screw 14 into and out of the clamp interior will adjust the position of the clamping plate 16 over a continuous range of the travel of the screw 14 and thereby also change the distance between the clamping surfaces.

Figure 1:
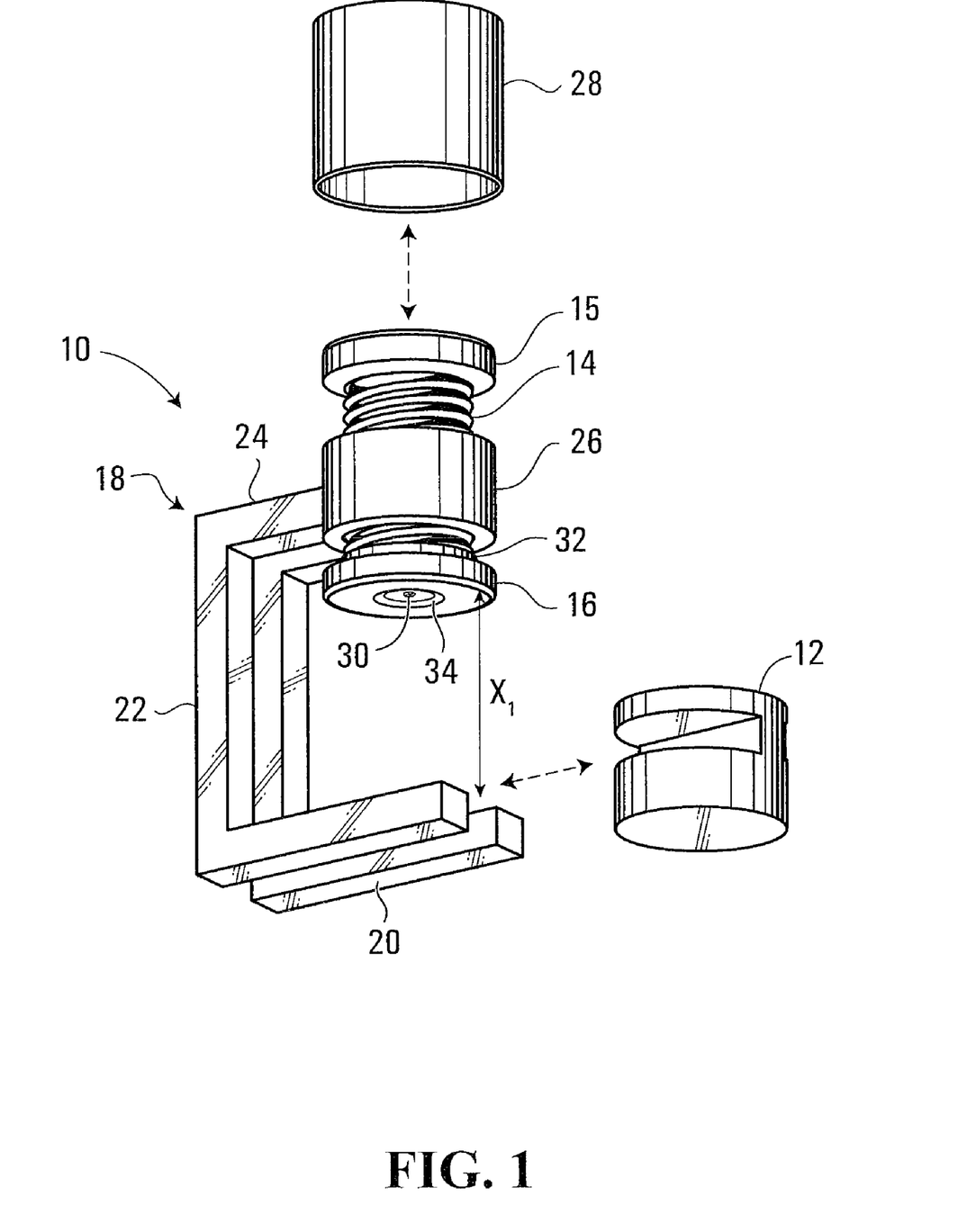
FIG. 1 is a perspective view of a clamp according to an embodiment of the invention in which a spacer is removed from the clamp.
Figure 2:
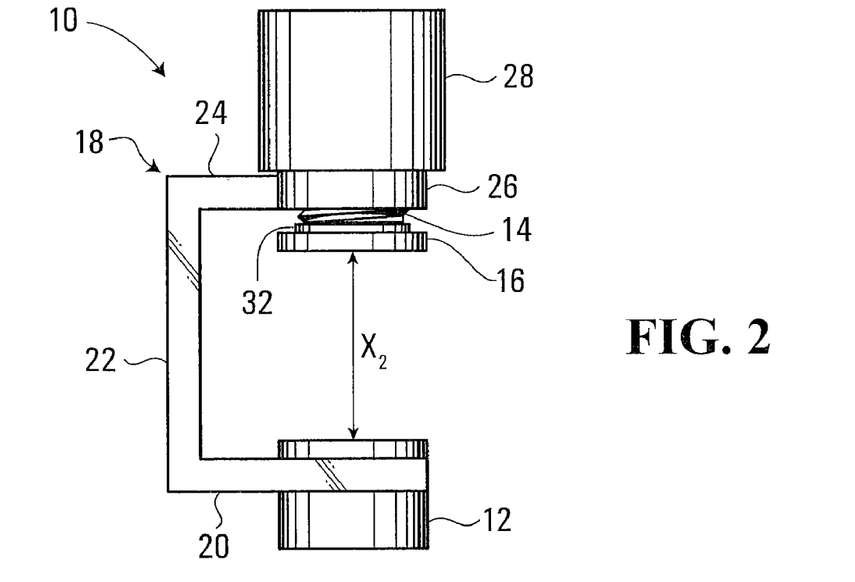
FIG. 2 is a side view of the embodiment of FIG. 1 in which the spacer is attached to the clamp in a first position.
Figure 3:
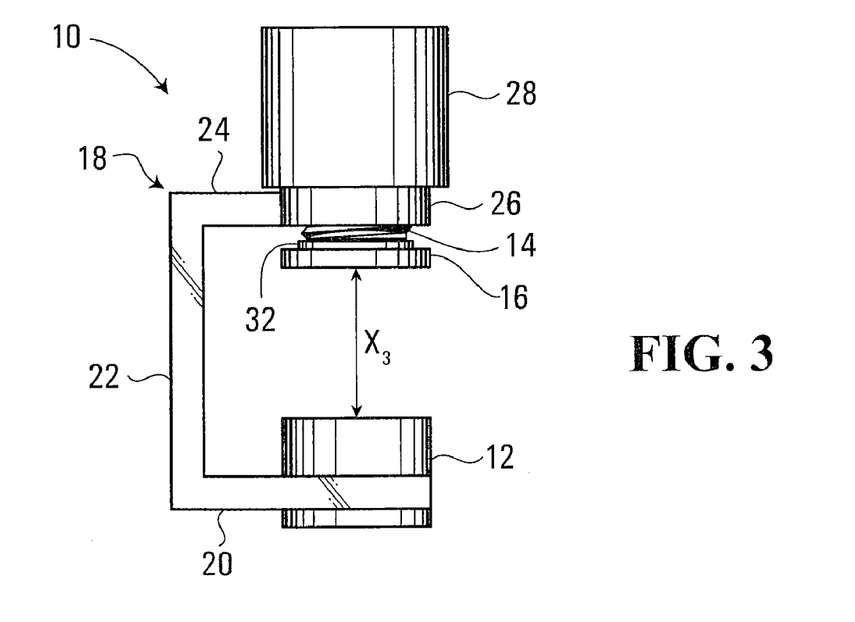
FIG. 3 is a side view of the embodiment of FIG. 1 in which the spacer is attached to the clamp in a second position.

Turning to the clamp in further detail, the clamp 10 includes a supporting frame or body 18. The body 18 is made up of two spacer arms 20 connected to two connecting arms 22 which in turn are connected to two head arms 24. In this embodiment, the arms 20, 22 and 24 have a square cross-section shape. The head arms 24 in turn connect to a head 26. As can be seen in the drawings, the embodiment of FIGS. 1, 2 and 3 is C-clamp. In other words, the arms 20, 22 and 24 define a squared C-shaped frame. In this embodiment, the spacer arms 20 are parallel to and spaced from the head arms 24 by the length of the connecting arms 22, with the connecting arms 22 being perpendicular to both the spacer arms 20 and the head arms 24. The arms 20, 22 and 24 consist of two parallel arms spaced by a constant gap.

Other orientations of the arms could be utilized with corresponding changes made, if needed, to the spacer 12 and the clamping plate 16. This invention is also applicable to other styles of clamps which are not C-clamps and could have different configurations for supporting the spacer 12 and the opposing clamping surface, such as the clamping plate 16 of this embodiment.

The head 26 in this embodiment, is connected to the head arms 24 at the opposite end of the head arms 24 from the connecting arms 22. It would be appreciated, that the head arms 24 can be completely eliminated if the head 26 were of a sufficiently large diameter. The head 26 is internally threaded with complimentary threads to the threads of the screw 14 so that the screw 14 can be screwed to move the clamping plate 16 into and out of the interior of the clamp 10 to shorten or lengthen a distance $X_1$ between the clamping surfaces.

The clamping plate 16 of this embodiment is generally ring shaped with an extension 32 which is smaller in diameter than the body of the clamping plate 16 and is roughly of the same diameter as the screw 14. However, such an extension is not essential. The clamping plate 16 is connected to the screw 14 by a smaller screw 30 which extends through a hole in the center of the clamping plate 16 and screws into the screw 14. The clamping plate 16 also has a depression 34 in the clamping surface. This depression 34 may be tapered or another shape depending on the shape of the head of the connecting screw 30. This depression ensures that the clamping surface of the clamping plate 16 contacts the surface to be clamped rather than the head of the connector screw 30. Additionally, when the connector screw 30 is screwed tightly into the clamping plate 16, the clamping plate 16 can still ride freely on the screw 30. In other words, the clamping plate 16 can rotate around on the screw 30.

Other means of securing the clamping plate 16 may also be used. For example, plate 16 may ride on a pin that is snap fit into the screw 14.

It will be appreciated that the clamping plate 16 and the screw 30 may be totally eliminated. The clamping surface on this side of the clamp would then be provided by the end of the screw 14. The clamp 10 may have to be held more securely for mounting in this configuration to prevent the contact between the rotating end of the screw 14 and the surface being clamped from causing the clamp 10 to travel along the surface. A protective material may also be used to protect the surface being clamped.

The screw 14 has a screw head 15. A screw cap 28 can be used to cover the screw head 15 and the upper threads of the screw 14. In this embodiment, the screw cap 28 is generally cylindrical. However, numerous other shapes may be used which are decorative such as triangular, octagonal or patterned screw caps. The screw cap 28 is a sleeve which covers the head of the screw 14 and it will be appreciated that the screw cap 28 may be completely eliminated. In this embodiment, the screw cap is retained by a press fit onto the screw head 15. Other retaining means such as a retaining screw through the cap 28 and the head 15 could also be used.

Figure 4:
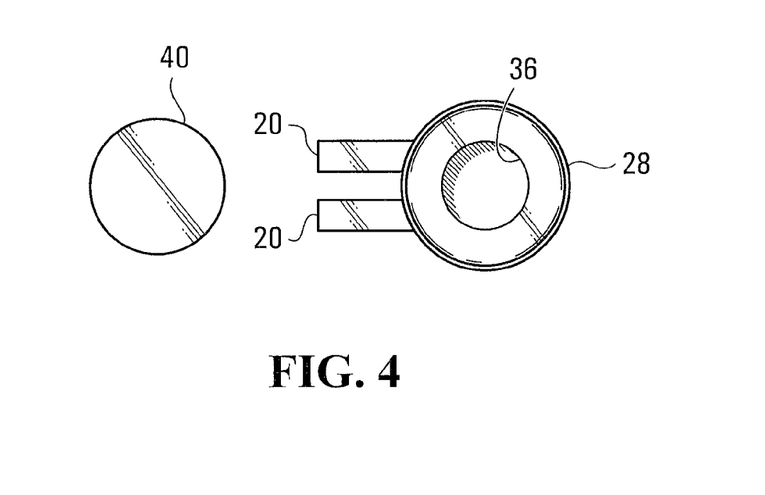
FIG. 4 is a top view of the embodiment of FIG. 1.
Figure 5:
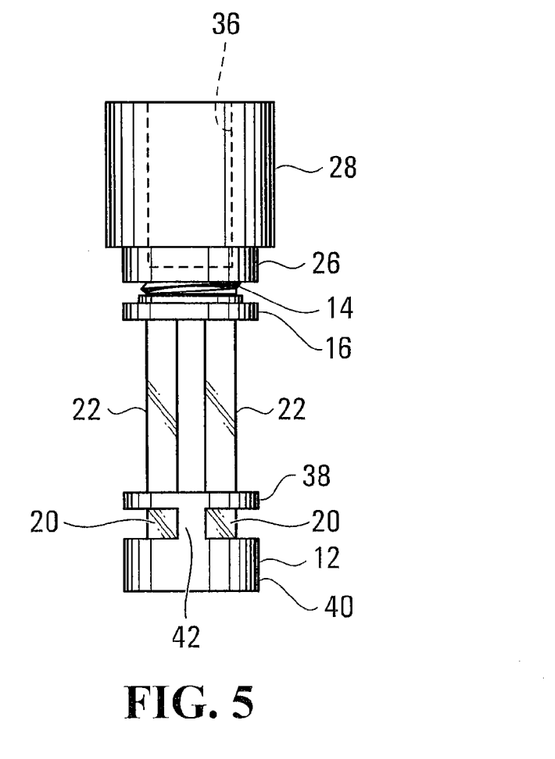
FIG. 5 is a front view of the embodiment of FIG. 2.
Figure 6:
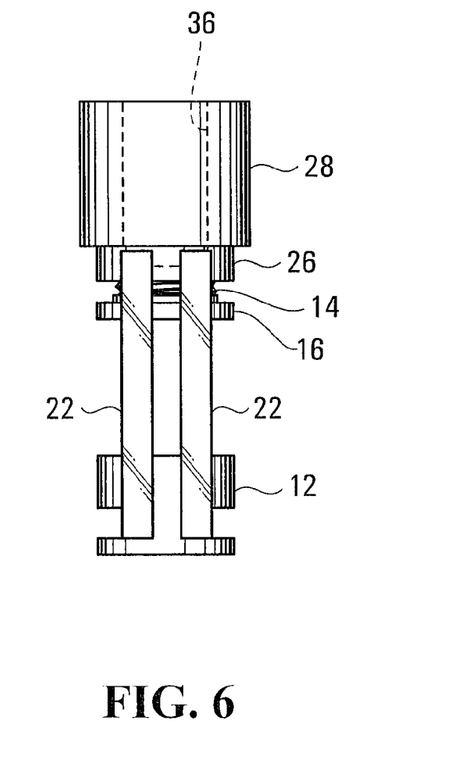
FIG. 6 is a rear view of the embodiment of FIG. 3.

As best seen in FIG. 4, there is a hole 36 which extends through the screw cap 28 and down into the screw 14. This hole 36 is a blind hole in this embodiment. In other words, it will typically not extend through the end of the screw 14. However, it could extend the entire length of screw 14. The hole 36 is for mounting an item on the clamp. For example, a task lamp may have a cylindrical end that is sized to fit within the hole 36. The positioning of the hole 36 is also visible in FIGS. 5 and 6. The hole 36 need not extend through the screw 14, for example, there may be a block of material mounted above or on the back of the arms 22 and the hole 36 may extend through that block.

Although the hole 36 and a complementary post at the bottom of a lamp could be used to mount a lamp on the clamp, any other fastening means known in the art may be used. For example, the clamp 10 could have a plate with holes on the arm 24 and an item to be fastened could have complementary holes for screwing to the plate. The advantage of the use of the clamp 10 in such a configuration is to avoid the necessity of drilling screw holes in, for example, the table.

As previously explained, the distance between the clamping surfaces may be varied by screwing the screw 14 in the head 26 inwards to the interior of clamp 10 and outwards from the interior of the clamp 10. In this example, the other way of altering the distance between the clamping surfaces is by use of the spacer 12. The geometry of the spacer 12 is best seen in the front view in FIG. 5. The spacer 12 is made up of a thin portion 38, a thick portion 40 and a narrow portion 42. In this embodiment, the thin portion 38 and the thick portion 40 are both cylindrical in shape and are connected by the narrow portion 42. The width of the narrow portion 42 of this embodiment is sized to fit within the width of the distance between the connecting arms 22 by being substantially the same width. Similarly, the space between the thin portion 38 and the thick portion 40, in other words the height of the narrow portion 42, is sized to fit around the thickness of the spacer arms 22 by being substantially the same width. With this sizing, the spacer 12 can be press fit onto the spacer arms 22 as shown in FIGS. 2, 3, 5 and 6 and thus retained in position. The particular shape of the spacer 12 is not essential. For example, the narrow portion 42 may be narrower and still have a press fit which retains the position. Other means of removably fastening the spacer in position may also be used, including a loose positioning that is secured by the clamping of clamp 10 when used. The spacer 12 may be any shape of block which, with the body 18, define co-operating protrusions and receiving portions for mounting the spacer block to the body 18.

As can be seen by comparing the distances $X_1$, $X_2$, and $X_3$ in FIGS. 1, 2 and 3, the distance $X_1$ and by extension the thickness of an item which can be clamped, is the maximum of the three distances when the spacer is totally removed as in FIG. 1. When the spacer 12 is press fit into the clamp with the thin portion 38 inside the clamp as shown in FIG. 2, the clamping distance is decreased to the distance $X_2$ by the thickness of the thin portion 38. When the spacer 12 is press fit into the clamp 10 in the orientation shown in FIG. 3, the distance is reduced to the distance $X_3$ by a larger amount namely by the thickness of the thick portion 40.

It will be appreciated that the use of the spacer 12 allows the distance to be decreased in increments based on the thickness of the portion of the spacer 12 which is added to the interior of clamp 10 inside of the spacer arms 20. The opposed, in other words the oppositely facing parallel clamping surfaces, are provided by the inner face of the clamping plate 16 and the inner face of the spacing arms 20 in FIG. 1, the inner face of the thin portion 38 in FIGS. 2 and 5 and the inner face of the thick portion 40 in FIGS. 3 and 6.

The use of the spacer 12 in conjunction with the screw 14 allows the screw 14 to be of a shorter length than if the spacer assembly was not available. In other words, for the clamp 10 to clamp to a thin item, the screw 14 only needs to be of sufficient length to travel the distance $X_3$ depicted in FIG. 3 rather than the longer distance $X_1$ depicted in FIG. 1. In some embodiments the travel of the screw 14 is ⅜ inches.

Other embodiments of the invention will now be discussed. The further embodiments will be discussed only to the extent that they differ from the embodiments of FIGS. 1 to 6. Like reference characters will be used for the same parts and the same parts will not be described in detail.

Figure 7:
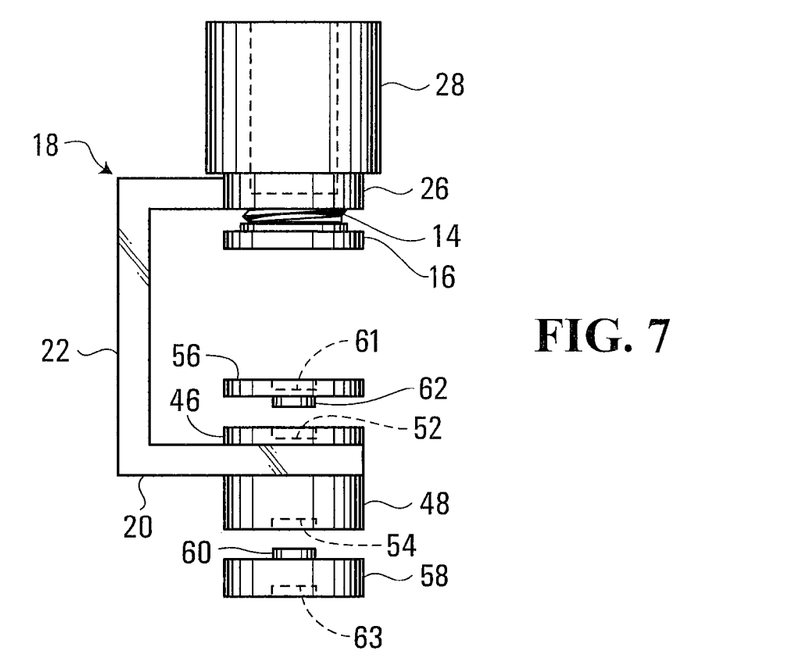
FIG. 7 is a side view of a second embodiment of the invention.
Figure 8A:
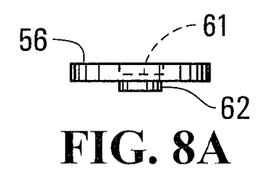
FIG. 8A is a side view of a spacer adjustment of the embodiment of FIG. 7.
Figure 8B:
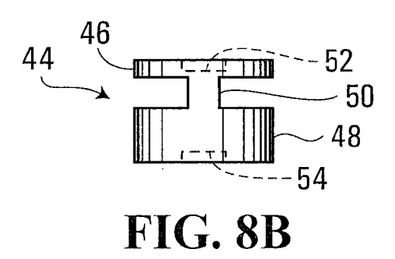
FIG. 8B is a side view of the spacer of the embodiment of FIG. 7.
Figure 8C:
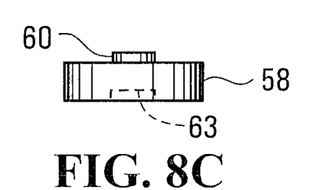
FIG. 8C is a side view of another spacer adjustment of the embodiment of FIG. 7.

FIG. 7 and FIGS. 8A to 8D show a different spacer assembly which can be used with the clamp body 18 described with respect to FIGS. 1 to 6. A spacer 44 has the same basic configuration as the spacer 12. In particular, the spacer 44 has a thin portion 46 connected to a thick portion 48 by a narrow portion 50. As with spacer 12, the spacer 44 is sized to be press fit onto the spacer arms 20 of the body 18 of the clamp 10. The spacer 44 differs from the spacer 12 in that the spacer 44 has a hole 52 defined on the outer flat side of the thin portion 46 and a hole 54 defined on the outer flat side of the thick portion 48 as seen in FIG. 8B. The hole 52 may be square but it also may be other shapes and may not be exactly centered on the surface.

The spacer assembly of FIGS. 7 and 8A to 8D also includes a thin spacer adapter 56 and a thick spacer adapter 58. The thin spacer adapter 56 has a protrusion 62 which is sized to fit within either the hole 52 or the hole 54. Similarly, the thick spacer adapter 58 has a protrusion 60. The adapters 56 and 58 also have holes 61 and 63 sized to fit the protrusions 60 and 62. It will be appreciated the spacer adapters 56 and 58 can be press fit onto the spacer 44 by inserting the protrusion 60 or 62 into the hole 52 or 54. The adapters can therefore be used to vary the thickness of the portion of the spacer assembly which is internal to the clamp 10 and therefore vary the distance between the clamping surfaces by increments other than the thickness of the thin portion 46 or the thick portion 48. Each of the adapters 56 and 58 may in turn have holes 61 and 60 on the opposite face from the protrusion so that further adapters may be connected to the adapters to allow further spacing increments. It will be appreciated that other co-operation protrusions and receiving portions for connecting the adapters to the spacer may be used. For example, the adapters may be screwed into position or have edge connectors for snapping into position. It will also be appreciated that the adapters need not be circular or of uniform size. Although the upper and lower surfaces of the adapters 56 and 58 and the spacers 12 and 44 are parallel, and the clamping surfaces are parallel, it will be appreciated that other configurations may be used. For example, if the clamp is to be attached to a pipe, the clamping surfaces may be concave.

FIGS. 9, 10, 11a and 11b depict another embodiment of the invention. The side view in FIG. 10 appears much the same as the embodiment depicted in FIGS. 1 to 8D, however, it will be appreciated from the perspective view in FIG. 9 that a clamp 63 depicted in FIGS. 9 and 10 differs from the clamp 10 depicted in FIGS. 1 to 3. In particular, the clamp body 64 of the clamp 63 is made up of a single piece rather than two parallel members. Clamp body 64 is made up of a head arm 66 connected to a connecting arm 68 which in turn is connected to a spacer arm 70 in the same manner as arms 20, 22 and 24. The screw cap 28, the head 26, the screw 14 and the clamping plate 16 of the clamp 63 are the same as the components in FIGS. 1 to 8.

Figure 11A:
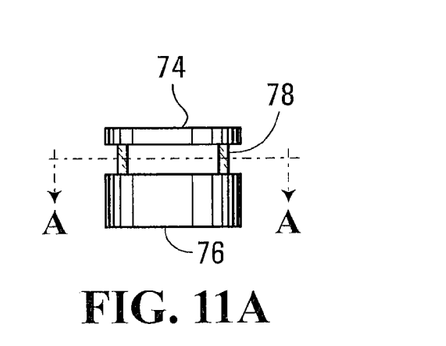
FIG. 11A is a front view of the spacer of the embodiment of FIG. 9.
Figure 11B:
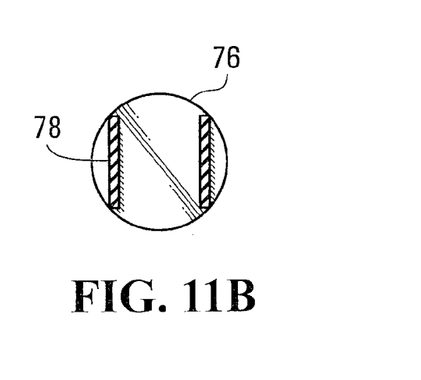
FIG. 11B is a sectional view of the spacer of FIG. 11A taken along line A-A of FIG. 11A.

Because the spacer arm 70 of the clamp 63 is a single piece, a spacer 72 of the clamp 63 differs from the spacer 12 of the clamp 10. The spacer 72 is made up of a thin portion 74 and a thick portion 76 similar to the thin portion 38 and the thick portion 40 described with respect to spacer 12. However, the thin portion 74 and the thick portion 76 are connected by a different means. Rather than having a narrow portion 42 which is press fit between two spacer arms 20, in this embodiment, there are connecting posts 78 on the sides of the spacer 72. These connecting posts 78 connect the thin portion 74 and the thick portion 76 as shown in FIGS. 11A and 11B. As can be seen from FIG. 9, the positioning of the connecting posts 78 allow the spacer arm 70 to be inserted between these connecting posts to fasten the spacer 72 in position. In other words, the thickness of the spacer arm 70 substantially equals length of the connecting posts 78 and the width between the connecting posts 78 substantially equals the width of the spacer arm 70 so that the spacer 72 is press fit into position around the spacer arm 70. A press fit is not essential and other configurations may be used. For example, one connecting post may be eliminated if the remaining connecting post is sufficiently rigid. The connecting posts 78 may be separate components which are attached to the thin portion 74 and the thick portion 78, for example, by an adhesive. Alternatively, the entire spacer 72 may be machined from a single block of material.

Figure 8D:
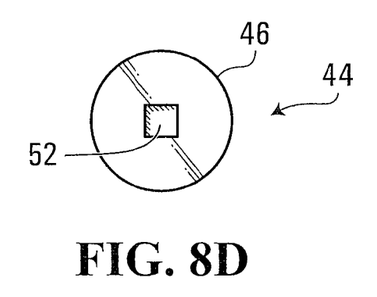
FIG. 8D is a top view of the spacer of the embodiment of FIG. 7.
Figure 9:
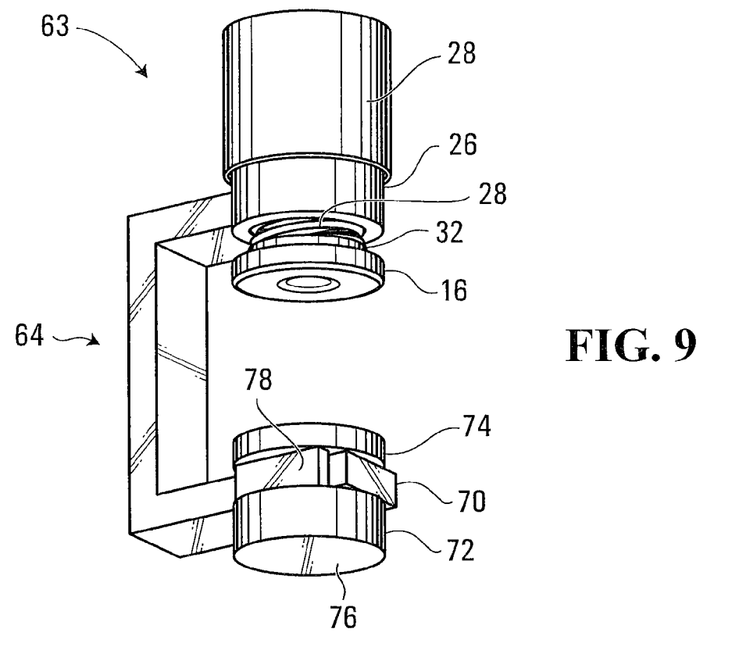
FIG. 9 is a perspective view of a clamp according to a third embodiment of the invention.
Figure 10:
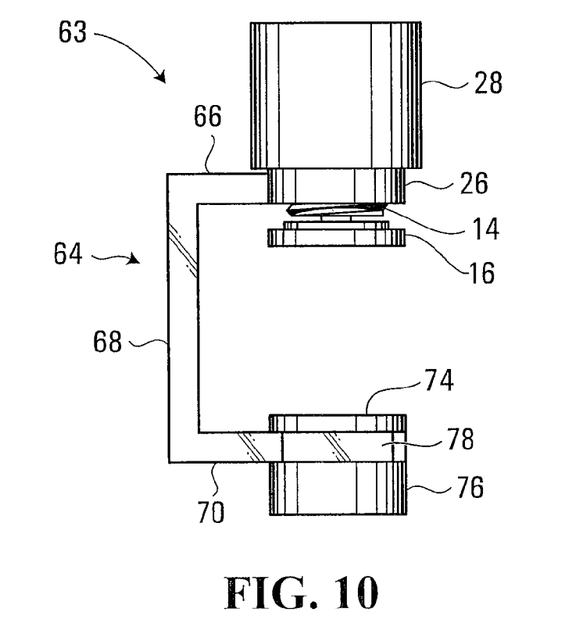
FIG. 10 is a side view of the embodiment of FIG. 9.

The spacer 72 could also be used with the clamp 10 and fitted to the outside of the spacer arms 22. The use of adapters as shown in FIGS. 7 to 8D could also be made to the spacer 72 of FIGS. 9 to 11B. The arms 22 and 24 may also be a single arm like arms 64 and 66.

Figure 12:
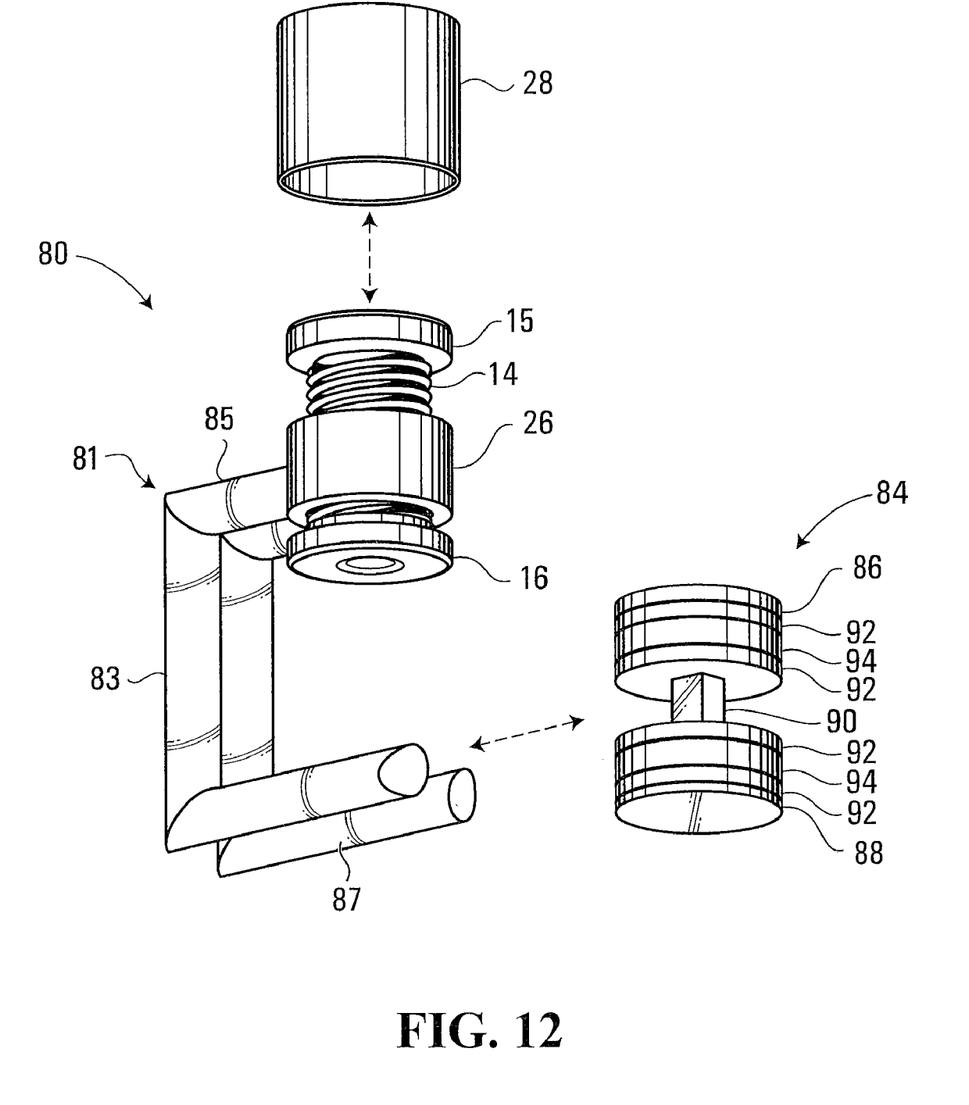
FIG. 12 is a perspective view of a fourth embodiment of the invention in which the spacer is removed from the clamp.
Figure 13:
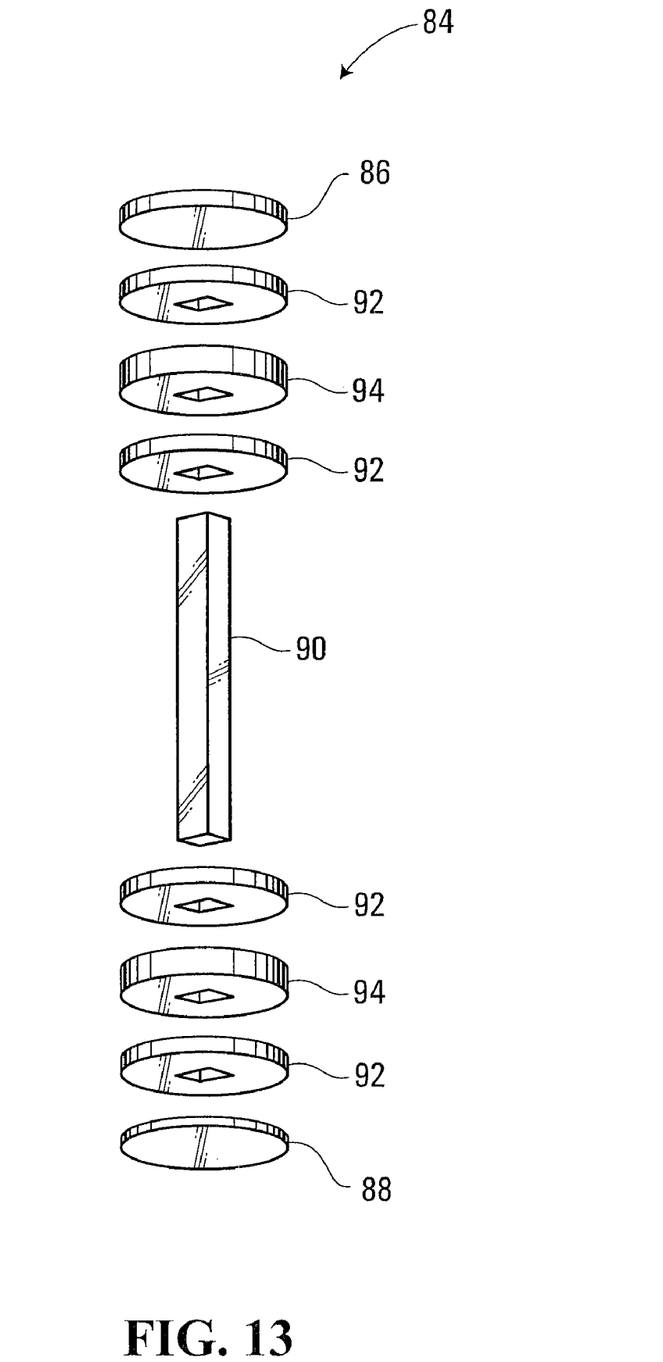
FIG. 13 is an exploded perspective view of the spacer of FIG. 12.

FIGS. 12 to 15 depict another embodiment of the invention. In particular, these Figures depict a clamp 80. The basic configuration of the clamp body 81 is the same as described with respect to FIGS. 1 to 6. In particular the clamp 80 is made up of a body 81 comprising spacer arms 87 connecting arm 83 and head arms 85. In this embodiment, these arms are depicted as having a tubular rather than square shape. The continuous adjustment assembly is comprised of the head 26, the screw 14 and the clamping plate 16 as previously described. In FIG. 12, the screw cap 28 is removed so that the screw head 15 is visible.

This embodiment includes a spacer 84. The spacer 84 is made up of first spacer end 86 in a second spacer end 88. The spacer ends 86 and 88 are connected by a rod 90. On the rod 90 between the spacer ends 86 and 88 are spacer elements which are thin spacer rings 92 and thick spacer rings 94. The spacer rings 92 and 94 each have a hole through them which is larger than the diameter of the rod 90. This allows the spacer rings 92 and 94 to move freely along the rod 92 within the limits of travel imposed by the spacer ends 86 and 88.

Figure 14:
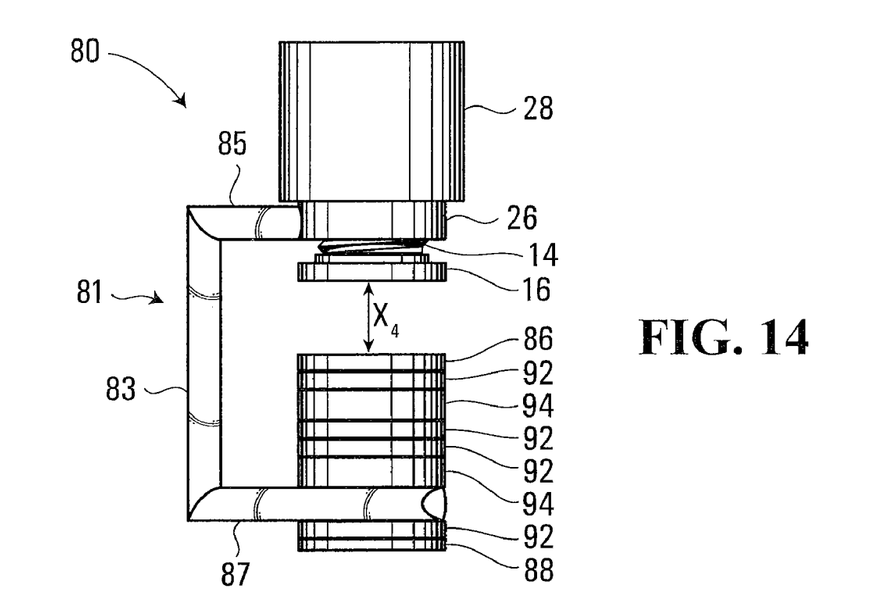
FIG. 14 is a side view of the embodiment of FIG. 12 with the spacer attached to the clamp in a first position.
Figure 15:
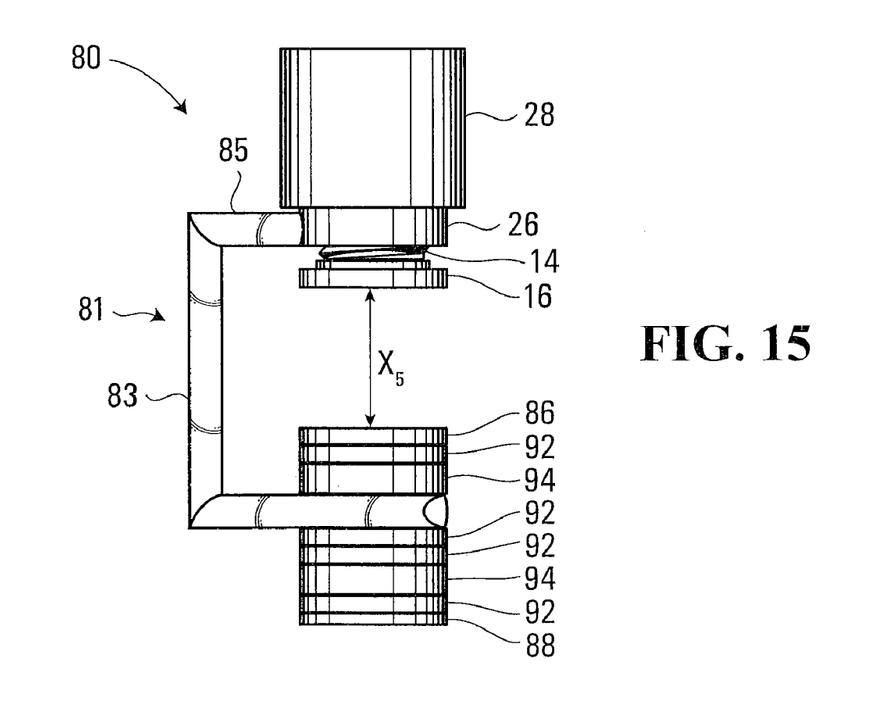
FIG. 15 is a side view of the embodiment of FIG. 13 with the spacer attached to the clamp in a second position.

The entire rod 90 is not occupied by spacer rings 92 and 94. It will be appreciated that there will always be a blank area or gap on the rod 90 as shown in FIG. 12. This area can be repositioned along the spacer 84 by sliding the spacer rings 92 and 94. For example, FIG. 15 depicts the gap in one position and FIG. 14 depicts the gap in another position. The size of this gap in this embodiment is about the same as the thickness of the spacer arms 20 so that the spacer arms 20 can be press fit between any two successive spacer rings 92, 94 or between a spacer end 86 or 88 and the next adjoining spacer ring 92 and 94. This allows for a wide range of incremental spacer thicknesses to be added to the interior of the clamp 80. For example, in FIG. 14, the distance has been decreased to a distance $X_4$ by the cumulative thickness of the spacer end 86, three thin spacer rings 92 and two thick spacer rings 94. In contrast, in FIG. 15 the distance has been reduced to a distance $X_5$ only by the thickness of the spacer end 86 and the thickness of one thin spacer ring 92 and one thin spacer ring 94.

It will be appreciated that the spacer 84 may have an effective thickness within the clamp 80 equal to the thickness of any successive grouping of spacer rings 92 and the associated spacer end 86 or 88. The spacer ends 86 and 88 may be smaller and fit within a recess in the end most spacer rings so they do not add to the effective thickness. Any thickness of rings and ends and positioning the spacer rings may be employed. For example, the rod 90 may be telescoping so that no gap is left and the rod is expanded to allow the insertion of the spacer arms 20 into the spacer 84. Alternatively, there may be multiple gaps. It would also be appreciated that spacer 84 may be configured similar to the spacer 72 of FIGS. 9 to 11B with peripheral rods rather than a central rod.

Although the embodiments depicted show circular spacers, it would be appreciated that other shapes may be employed. The spacers also may be screwed in or slid in from the sides rather than the front. The spacer, rather than the screw can have a hole or other protrusion or receiving portion to which an object can be mounted.

Although the embodiments depicted show the continuous adjustable screw assembly at one end of the clamp and the spacers at the opposite end of the clamp, it will be appreciated that spacers could also be attached to the clamping plate or be used in line in the connecting arms 22 as extensions.

An adjustable assembly other than a screw may be used as the complementary adjustment assembly to the spacer assembly. For example, a cam assembly may be used. The screw 14 may be replaced by a shaft connected to a cam. The cam in turn is connected to a rod. When the cam is in a released position, the shaft would slide freely up and down inside the head. When the rod is rotated to the engaged position, the cam will press against the shaft, holding it in place.

The parallel connecting arms 22 may also be used to facilitate a tracking system. For example, the arms may be extended to a much greater length than depicted in the figures and elements fixed between these parallel tracks or arms.

Numerous modifications and variations of the present invention are possible in light of the above teachings. It is therefore to be understood that within the scope of the appended claims, the invention may be practiced otherwise than as specifically described herein.

I claim:

1. A clamp comprising:
a frame supporting first and second opposed members having clamping surfaces defining a distance therebetween for receiving and clamping an object;
an adjustment mechanism associated with at least one of the members for varying the distance over a continuous range; and
a spacer assembly comprising a first end and a second end and at least one gap between the first end and the second end;
wherein the spacer assembly is removably fastenable to the first member by fitting at least a portion of the first member into the at least one gap with the first end or the second end forming one of the clamping surfaces to decrease the distance by at least one discrete increment.

2. The clamp of claim 1 wherein the spacer assembly comprises a block having a thickness and the block and the first member define co-operating protrusions and receiving portions for fastening the block to the second member with the distance decreased by the thickness.

3. The clamp of claim 2 wherein the protrusions comprise the first member having parallel arms which define a channel therebetween and the receiving portions comprise a narrow portion of the block sized to receive the arms.

4. The clamp of claim 3 wherein the narrow portion comprises a post which connects a first portion of the block to a second portion of the block.

5. The clamp of claim 4 wherein first portion of the block has a first thickness and the second portion of the block has a second thickness different from the first thickness and the block can be reversibly fastened in the first member wherein the distance can be decreased by either the first thickness or the second thickness.

6. The clamp of claim 2 wherein the spacer assembly further comprises at least one block adapter having an adapter thickness wherein the block and the block adapter define co-operating adapter protrusions and receiving portions for fastening the block adapter to the block to further decrease the distance by the adapter thickness.

7. The clamp of claim 6 wherein the adapter protrusions comprise at least one post projecting from the adapter and sized to fit into a hole on the block.

8. The clamp of claim 6 further comprising at least one second adapter having a second adapter thickness wherein the adapter and the at least one second adapter define further co-operating protrusions and receiving portions for fastening the second adapter to the block adapter to further decrease the distance by the second adapter thickness.

9. The clamp of claim 1 wherein the adjustment mechanism is associated with the second member.

10. The clamp of claim 9 wherein the adjustment mechanism comprises a threaded opening in the second member and a threaded bolt axially moveable therein in a direction of the distance.

11. The clamp of claim 1 wherein the spacer comprises a first thickness between the first end and the gap and a second thickness between the second end and the gap and wherein the spacer is reversibly fastenable to the first member to decrease the distance with the discrete increment equal to the first thickness or the second thickness.

12. The clamp of claim 11 wherein the first thickness is different from the second thickness.

13. A clamp comprising:
   a frame supporting first and second opposed members having clamping surfaces defining a distance therebetween for receiving and clamping an object;
   an adjustment mechanism associated with at least one of the members for varying the distance over a continuous range; and
   a spacer assembly removably fastenable to at least one of the members for varying the distance by at least one discrete increment;
   wherein the spacer assembly comprises a rod having spacing elements slidably retained on the rod; a space being movable between the spacing elements by moving the spacing elements on the rod; the first member defining a protrusion for insertion into the space for fastening the spacer assembly to the first member, the distance decreasing by the thickness of the spacing elements inserted into the distance.

14. The clamp of claim 13 wherein the protrusions comprise the first member having parallel arms which define a channel therebetween for receiving a portion on the rod extending through the space.

15. The clamp of claim 14 wherein the spacing element further comprise plates fastened on each end of the rod.

16. The clamp of claim 13 wherein the spacing elements comprise a plurality of rings of different thicknesses.

17. A clamp comprising:
   a frame supporting opposed members having clamping surfaces defining a distance therebetween for receiving and clamping an object;
   an adjustment mechanism associated with at least one of the members for varying the distance over a continuous range; and
   a spacer assembly being removably fastenable to at least one of the members for varying the distance by at least one discrete increment,
   wherein the opposed members comprise a first member and a second member and the spacer assembly is associated with the first member and the adjustment mechanism is associated with the second member,
   wherein the adjustment mechanism comprises a threaded opening in the second member and a threaded bolt axially moveable therein in a direction of the distance, and
   wherein the bolt comprises an orifice opposite the direction, the orifice being sized to receive a post for mounting the post thereto.

18. The clamp of claim 17 wherein the post is a post of a table lamp for mounting the table lamp to a table.

19. The clamp of claim 17 further comprising a removable sleeve encircling a head of the bolt.

20. The clamp of claim 17 wherein the adjustment mechanism further comprises a plate mounted to rotate on the end of the bolt for clamping the object.

* * * * *